US012017460B2

(12) United States Patent
Oka et al.

(10) Patent No.: US 12,017,460 B2
(45) Date of Patent: Jun. 25, 2024

(54) INK CARTRIDGE, CARTRIDGE HOLDING MECHANISM, AND PRINTING APPARATUS

(71) Applicant: FUNAI ELECTRIC CO., LTD., Osaka (JP)

(72) Inventors: Junpei Oka, Osaka (JP); Kohsuke Hori, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 39 days.

(21) Appl. No.: 17/705,379

(22) Filed: Mar. 27, 2022

(65) Prior Publication Data

US 2022/0339944 A1 Oct. 27, 2022

(30) Foreign Application Priority Data

Apr. 26, 2021 (JP) ................................ 2021-074208

(51) Int. Cl.
*B41J 2/175* (2006.01)

(52) U.S. Cl.
CPC ......... *B41J 2/17523* (2013.01); *B41J 2/1754* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1754; B41J 2/17553
See application file for complete search history.

(56) References Cited

U.S. PATENT DOCUMENTS

| | | | | |
|---|---|---|---|---|
| 5,883,652 | A * | 3/1999 | Moser | B41J 2/17506 347/85 |
| 5,940,104 | A * | 8/1999 | Karita | B41J 2/17536 347/87 |
| 6,022,102 | A * | 2/2000 | Ikkatai | B41J 2/2056 347/85 |
| 6,264,316 | B1 * | 7/2001 | Chino | B41J 2/1752 347/86 |
| 6,312,115 | B1 * | 11/2001 | Hara | B41J 2/17533 347/86 |
| 6,773,097 | B2 * | 8/2004 | Dowell | B41J 2/17509 347/85 |
| 10,611,164 | B2 | 4/2020 | Nukui | |
| 2007/0296775 | A1 | 12/2007 | Lee et al. | |

FOREIGN PATENT DOCUMENTS

| | | |
|---|---|---|
| EP | 1069990 | 1/2001 |
| EP | 1384589 | 1/2004 |
| JP | 2002370384 | 12/2002 |
| JP | 2008006808 | 1/2008 |
| JP | 2012196776 | 10/2012 |
| JP | 2019171734 | 10/2019 |
| WO | 2007142263 | 12/2007 |

* cited by examiner

*Primary Examiner* — Anh T Vo
(74) *Attorney, Agent, or Firm* — JCIPRNET

(57) ABSTRACT

An ink cartridge includes a main body, a head part, a first hole, a label, and a second hole. The main body stores ink. The head part is provided on the main body and has a plurality of nozzles for ejecting ink. The first hole has a tapered shape which narrows from an outer side toward an inner side of the main body, and a needle for supplying ink to the main body is inserted into the first hole. The label in a film shape is attached to the main body. The second hole is provided at the label and overlaps the first hole in a plan view of the label. The second hole guides the needle to the first hole when the needle is inserted.

12 Claims, 7 Drawing Sheets

INK CARTRIDGE, CARTRIDGE HOLDING MECHANISM, AND PRINTING APPARATUS

CROSS-REFERENCE TO RELATED APPLICATION

This application claims the priority benefit of Japan application serial no. 2021-074208, filed on Apr. 26, 2021. The entirety of the above-mentioned patent application is hereby incorporated by reference herein and made a part of this specification.

BACKGROUND

Technical Field

The disclosure relates to an ink cartridge, a cartridge holding mechanism, and a printing apparatus.

Related Art

Conventionally, an inkjet printing apparatus including an ink cartridge having a print head is known (see Patent Document 1 (Japanese Patent Application Laid-Open No. 2008-006808), Patent Document 2 (Japanese Patent Application Laid-Open No. 2002-370384), Patent Document 3 (Japanese Patent Application Laid-Open No. 2019-171734), Patent Document 4 (Japanese Patent Application Laid-Open No. 2012-196776), and Patent Document 5 (International Publication No. 2007/142263)). As an ink supply method to the print head, it is a mainstream method to insert a tip of a needle into a supply hole provided at an upper part of the ink cartridge, and pour ink from an ink tank into the ink cartridge via a tube and the needle.

However, according to the related art, it is necessary to provide a mechanism such as a guide member or a guide groove for correctly inserting the needle into the hole of the ink cartridge, and there is a problem that the component cost and the manufacturing cost increase due to the increase in the number of components.

SUMMARY

An ink cartridge according to an aspect of the disclosure includes a main body, a head part, a first hole, a label, and a second hole. The main body stores ink. The head part is provided on the main body and has a plurality of nozzles for ejecting ink. A needle for supplying ink to the main body is inserted into the first hole, and the first hole has a tapered shape which narrows from an outer side toward an inner side of the main body. The label in a film shape is attached to the main body. The second hole is provided at the label and overlaps the first hole in a plan view of the label. The second hole guides the needle to the first hole when the needle is inserted.

Accordingly, since the second hole of the label guides the needle to the first hole, a component for guidance can be omitted or a groove for guidance can be omitted. As a result, it is possible to reduce the number of components and thus reduce the component cost and the manufacturing cost.

Herein, an inner diameter of the second hole may be smaller than an inner diameter of the first hole.

Accordingly, the performance of the second hole of the label guiding the needle can be better exhibited.

Herein, the main body may include a needle receiving member having elasticity, and the first hole may be provided in the needle receiving member.

Accordingly, with the guidance by the second hole of the label combined with the elasticity of the needle receiving member, it is possible to more reliably and more smoothly guide the needle to the first hole.

Herein, a lateral surface of the first hole may have a tapered shape, and an inner diameter of the lateral surface of the first hole may decrease from the outer side toward the inner side of the main body.

Accordingly, it is possible to more reliably and more smoothly guide the needle to the first hole.

Herein, the second hole may guide the needle to the first hole by coming into contact with the needle when the needle is inserted.

Accordingly, it is possible to ensure the performance of the second hole of the label guiding the needle.

Herein, an inner diameter of the second hole may be larger than an outer diameter of a tip part of the needle.

Accordingly, even if the inner diameter of the second hole is larger than the outer diameter of the tip part of the needle, the second hole can guide the needle as long as the second hole and the needle come into contact with each other when the needle is inserted.

Herein, the label may include at least one of polyester, polyethylene, polypropylene, polystyrene, and vinyl chloride.

Accordingly, it is possible to use a material which is inexpensive and easy to process in the production of the label.

Herein, the ink cartridge may include n (n being an integer of 2 or more) first holes, and n second holes corresponding to the n first holes. The main body may have n ink chambers.

Accordingly, it is possible to reduce the number of components and thus reduce the component cost and the manufacturing cost in a color ink cartridge capable of supporting n colors.

Further, a cartridge holding mechanism according to an aspect of the disclosure includes the ink cartridge above, a holding member which holds the ink cartridge, a lid member which covers the ink cartridge held by the holding member, and a hinge which connects the lid member and the holding member. The lid member has the needle.

Accordingly, when the needle which moves with the hinge serving as an axis is inserted into the first hole, the second hole of the label can guide the needle to the first hole. Therefore, a component for guidance can be omitted or a groove for guidance can be omitted. As a result, it is possible to reduce the number of components and thus reduce the component cost and the manufacturing cost.

Herein, an outer diameter of a tip part of the needle may be smaller than an inner diameter of the second hole.

Accordingly, the performance of the second hole of the label guiding the needle can be better exhibited.

Herein, a portion of the needle in a longitudinal direction may have a tapered part of which an outer diameter gradually increases from a tip part of the needle toward the lid member. The outer diameter of the tapered part may be larger than an inner diameter of the second hole. With the lid member closed, the tapered part may press a peripheral portion of the second hole of the label.

Accordingly, the sealing property at the first hole of the ink cartridge can be improved.

Herein, the second hole may guide the needle to the first hole by coming into contact with the needle when the lid member shifts from an opened state to a closed state.

Accordingly, it is possible to ensure the performance of the second hole of the label guiding the needle.

Further, a printing apparatus according to an aspect of the disclosure includes the cartridge holding mechanism above, an ink tank, and a tube which connects the ink tank and the needle.

Accordingly, since the second hole of the label guides the needle to the first hole, a component for guidance can be omitted or a groove for guidance can be omitted. As a result, it is possible to reduce the number of components and thus reduce the component cost and the manufacturing cost.

According to the ink cartridge, the cartridge holding mechanism, and the printing apparatus of the disclosure, it is possible to reduce the number of components and thus reduce the component cost and the manufacturing cost.

DESCRIPTION OF THE EMBODIMENTS

Embodiments of the disclosure provide an ink cartridge, a cartridge holding mechanism, and a printing apparatus which reduce the number of components and thus reduce the component cost and the manufacturing cost.

Hereinafter, embodiments of the disclosure will be described in detail with reference to the drawings. The embodiments described below all show comprehensive or specific examples of the disclosure. Numerical values, shapes, materials, components, arrangement positions of components, connection forms, and the like shown in the following embodiments are exemplary and are not intended to limit the disclosure. Further, among the components in the following embodiments, the components not described in the independent claims which indicate the most general concepts will be described as arbitrary components.

Embodiment

[1. Configuration Example of Main Part of Cartridge Holding Mechanism]

First, a configuration of a main part of an ink cartridge holding mechanism according to an embodiment will be described with reference to FIG. 1 to FIG. 3.

Figure 1:
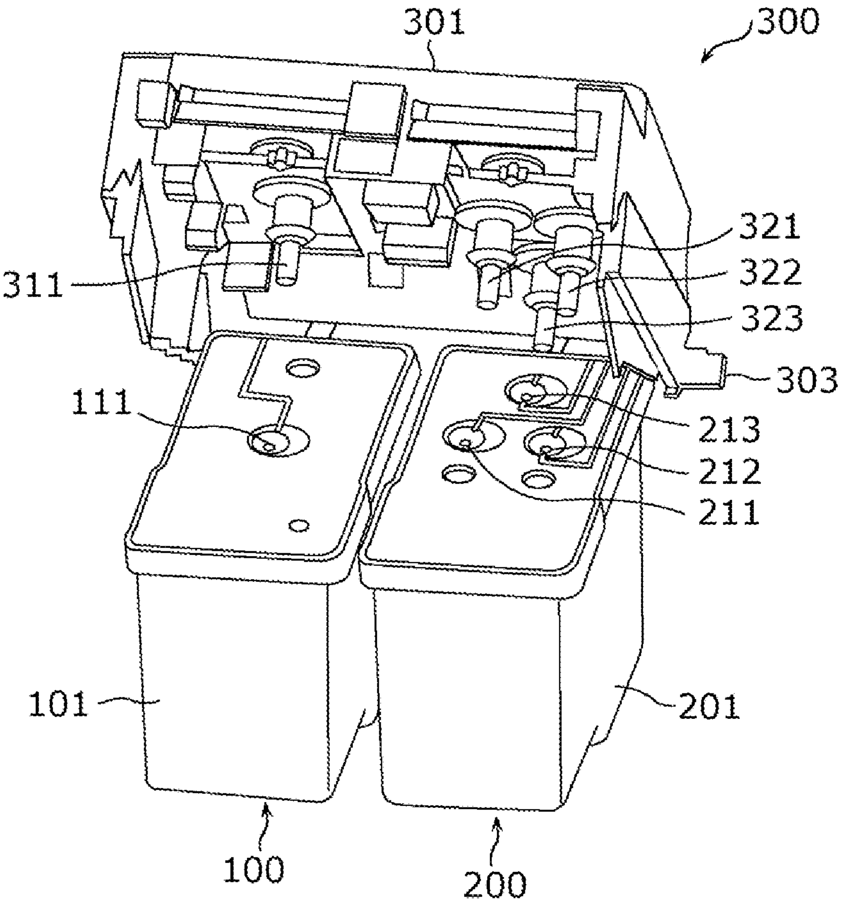
FIG. 1 is a perspective view showing an external appearance example of a main part of a cartridge holding mechanism according to an embodiment.

FIG. 1 is a perspective view showing an external appearance example of a main part of a cartridge holding mechanism 300 according to an embodiment. FIG. 2 is a perspective view showing an internal configuration example of a lid member 301 in FIG. 1. In FIG. 2, to show the inside of the lid member, illustration of a plate-shaped member at an upper surface covering over the inside is omitted. FIG. 3 is a view showing a cross-sectional configuration example of the lid member 301 of FIG. 2.

The cartridge holding mechanism 300 of FIG. 1 is a mechanism which holds ink cartridges 100 and 200, is provided inside an inkjet printing apparatus, and is configured to be movable in a direction along a printing surface of a printing target.

The cartridge holding mechanism 300 of FIG. 1 includes an ink cartridge 100, an ink cartridge 200, and a lid member 301.

The ink cartridge 100 includes a main body 101 storing black ink, a first hole 111, and a plurality of nozzles ejecting black ink. The first hole 111 is a hole for receiving supply of black ink. Therefore, a needle 311 of the lid member 301 is inserted into the first hole 111. The first hole 111 has a tapered shape which narrows from an outer side toward an inner side of the main body 101. Although not shown in FIG. 1, the plurality of nozzles are regularly arranged at a head part on a lower surface of the main body 101.

The ink cartridge 200 includes a main body 201 storing color ink, three first holes 211, 212, and 213, and a plurality of nozzles ejecting color ink.

The main body 201 has three chambers storing color ink of three colors of CMY (cyan, magenta, and yellow). The first holes 211, 212, and 213 are respectively connected to the three chambers.

The first hole 211 is a hole for receiving supply of yellow ink. Therefore, a needle 321 of the lid member 301 is inserted into the first hole 211.

The first hole 212 is a hole for receiving supply of cyan ink. Therefore, a needle 322 of the lid member 301 is inserted into the first hole 212.

The first hole 213 is a hole for receiving supply of magenta ink. Therefore, a needle 323 of the lid member 301 is inserted into the first hole 213.

Each of the first holes 211, 212, and 213 has a tapered shape which narrows from an outer side toward an inner side of the main body 201.

Further, the ink cartridge 200 has a head part provided on a lower surface of the main body 201. Although not shown in FIG. 1, the head part has a plurality of nozzles regularly arranged for each color.

The lid member 301 has a needle 311 for supplying ink to the ink cartridge 100 and needles 321 to 323 for supplying ink to the ink cartridge 200.

With the lid member 301 opened, the ink cartridge 100 and the ink cartridge 200 are mounted to the cartridge holding mechanism 300. After mounting, the lid member 301 is closed by rotating on a hinge 303. By closing the lid member 301, the needle 311 is inserted into the first hole 111 at an upper surface of the ink cartridge 100. Further, the needles 321, 322, and 323 are respectively inserted into the first holes 211, 212, and 213 at an upper surface of the ink cartridge 200.

Figure 2:
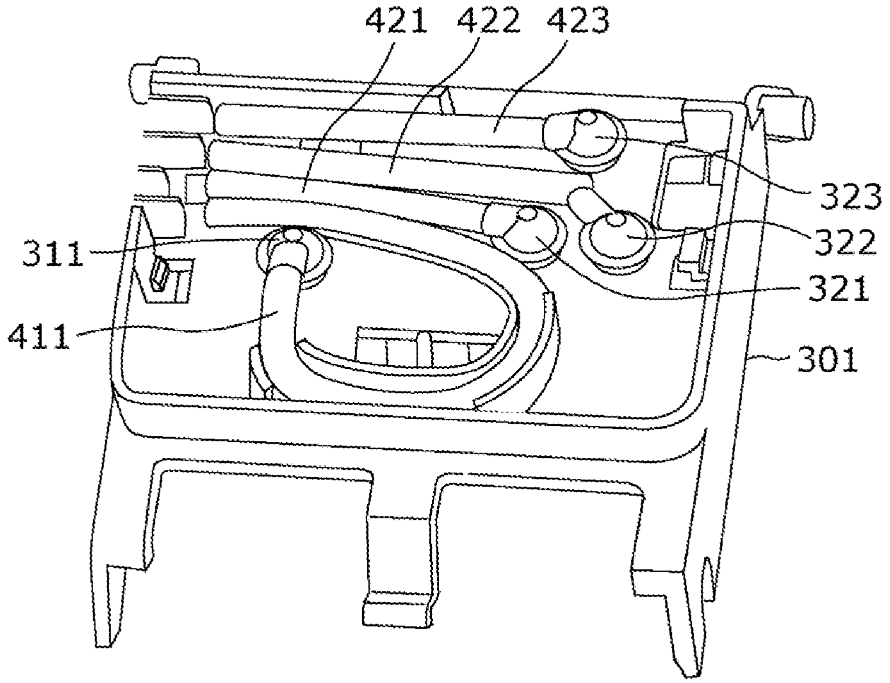
FIG. 2 is a perspective view showing an internal configuration example of a lid member according to the embodiment.
Figure 3:
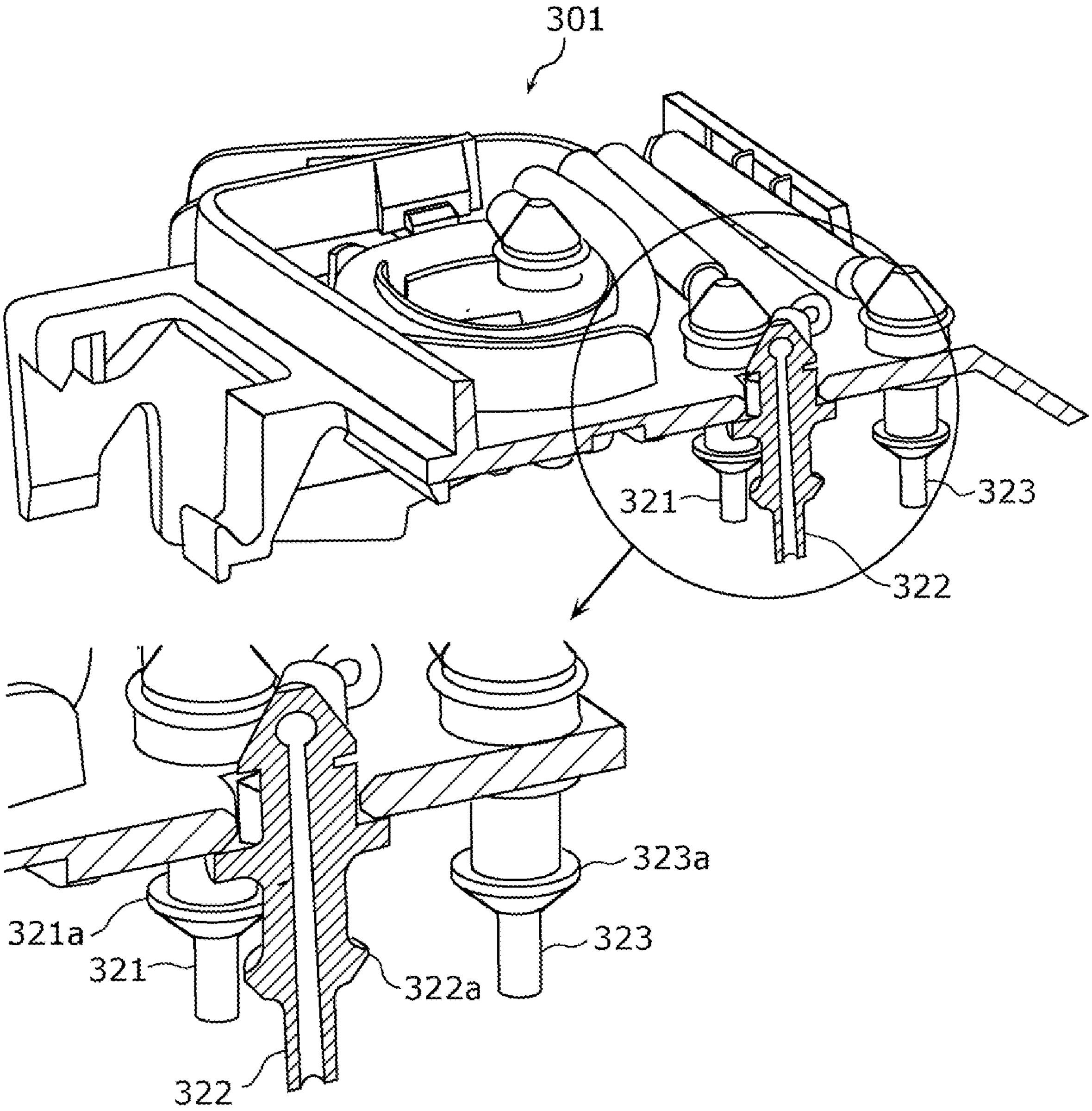
FIG. 3 is a view showing a cross-sectional configuration example of the lid member and a needle according to the embodiment.

Although the cartridge holding mechanism 300 of FIG. 1 to FIG. 3 holds both the ink cartridge 100 and the ink cartridge 200, it may also be configured to hold either one of them.

[1.1 Configuration of Lid Member]

Next, a specific configuration of the lid member 301 will be described.

As shown in FIG. 2, the lid member 301 has needles 311 and 321 to 323, and tubes 411 and 421 to 423.

The needle 311 has a hollow flow path extending in a longitudinal direction and is connected to the tube 411. The tube 411 is a flow path which connects an external ink tank and the needle 311 and supplies black ink from the ink tank to the needle 311.

The needle 321 has a hollow flow path extending in a longitudinal direction and is connected to the tube 421. The tube 421 is a flow path which connects an external ink tank and the needle 321 and supplies yellow ink from the ink tank to the needle 321.

The needle 322 has a hollow flow path extending in a longitudinal direction and is connected to the tube 422. The tube 422 is a flow path which connects an external ink tank and the needle 322 and supplies cyan ink from the ink tank to the needle 322.

The needle 323 has a hollow flow path extending in a longitudinal direction and is connected to the tube 423. The tube 423 is a flow path which connects an external ink tank and the needle 323 and supplies magenta ink from the ink tank to the needle 323.

For example, as shown in the cross-sectional view of FIG. 3, a portion of the needle 322 in the longitudinal direction has a tapered part 322*a* of which an outer diameter gradually increases from a tip of the needle 322 toward the lid member 301. Among end parts of the needle 322, the end part on the ink cartridge 200 side is referred to as a tip part, and the end part on the lid member 301 side is referred to as a head part. The head part of the needle 322 is not tightly fixed to the lid member 301, but is loosely fixed and has play.

In a closing operation in which the lid member 301 shifts from an opened state to a closed state, each needle does not move in a straight line, but moves in an arc shape since it rotates on the hinge 303 of the lid member 301. Therefore, although each needle is located at the center of the corresponding first hole in the closed state, in a state halfway to the closed state, the tip part of each needle moves at a position slightly deviated from the center position of the corresponding first hole. The play is provided to facilitate guiding the deviated position of the tip part of the needle to the first hole and to smooth the operation of closing the lid member 301.

The size of the play may be within a range in which the deviated position of the tip part of the needle can be guided to the first hole, and may be, for example, about 1 mm at the tip part of each needle.

FIG. 3 has shown a cross-sectional example of the needle 322 having the tapered part 322*a*, but the needles 311, 321, and 323 also respectively have tapered parts 311*a*, 321*a*, and 323*a*. Further, the needles 311, 321, and 323 also have play.

The cross section cut by a plane orthogonal to the longitudinal direction of each needle may be circular or may be non-circular. For example, the cross section cut by a plane orthogonal to the longitudinal direction of each needle may be elliptical or polygonal.

Further, the dimensions of each needle may be the same as or different from any of the other needles.

[1.2 Ink Cartridge for Black Ink and Label]

Next, a configuration of the ink cartridge 100 will be described in more detail.

Figure 5:
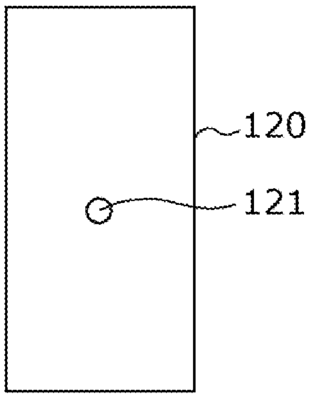
FIG. 5 is a top view of a label for an ink cartridge supporting black ink according to the embodiment.

The ink cartridge 100 includes a label 120 shown in FIG. 5. Although omitted in FIG. 1, the label 120 is attached to the upper surface of the main body 101 by an adhesive or an adhesive tape, and a character string such as a product name, a model number, and a cautionary note of the ink cartridge 100 is printed thereon.

Figure 4:
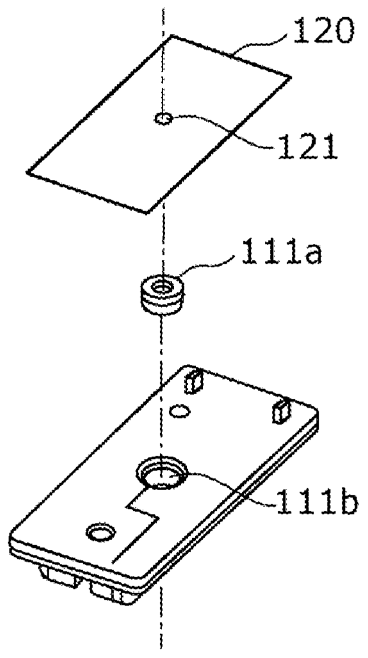
FIG. 4 is an exploded perspective view including an upper surface of the ink cartridge, a needle receiving member, and a label according to the embodiment.

As shown in FIG. 4, the first hole 111 of the ink cartridge 100 may be provided in a needle receiving member 111*a* at the upper surface of the ink cartridge 100. FIG. 4 is an exploded perspective view including the upper surface of the main body 101, the needle receiving member 111*a*, and the label 120 of the ink cartridge 100 according to the embodiment.

The needle receiving member 111*a* is made of an elastic material such as rubber and has the first hole 111. The needle receiving member 111*a* is fitted into a hole 111*b* at the upper surface of the ink cartridge 100. An outer diameter shape of the needle receiving member 111*a* may be substantially the same as an inner diameter shape of the hole 111*b* at the upper surface of the ink cartridge 100.

A lateral surface of the first hole 111 provided in the needle receiving member 111*a* has a tapered shape. That is, an inner diameter of the lateral surface of the first hole 111 decreases from the outer side toward the inner side of the main body 101. This tapered shape facilitates guiding the tip part of the needle into the first hole 111. For example, a length of the first hole 111 in an up-down direction may be about 0.5 to 3 mm, and an angle of the tapered shape may be about 45 degrees. The angle referred to herein is an angle with respect to the normal of the upper surface of the ink cartridge 100. The length and the angle described above are not limited thereto. The length, the angle, and the first hole 111 may be set so that the needle can be guided appropriately.

The label 120 includes a second hole 121 which overlaps the first hole 111 of the main body 101 in a plan view of the label 120. The plan view referred to herein is one that views the upper surface of the main body 101 of FIG. 1 and the label 120 from the direction of the lid member 301. A central axis of the second hole 121 may be aligned with a central axis of the first hole 111, may be slightly deviated, or may be slightly deviated in a direction away from the hinge 303. Herein, “slightly” means being within a range in which the guiding function can be fulfilled.

Further, the label 120 is a film containing at least one of polyester, polyethylene, polypropylene, polystyrene, and vinyl chloride. For example, the label 120 is formed of a film obtained by coating 0.025 mm of polyester on 0.066 mm of polypropylene.

The second hole 121 is configured to guide the needle 311 of the lid member 301 to the first hole 111 when the needle 311 is inserted. For example, an inner diameter of the second hole 121 may be smaller than an inner diameter of the first hole 111. The inner diameter of the first hole 111 referred to herein may be a maximum value of the inner diameter when the lateral surface of the first hole 111 has a tapered shape.

Further, the inner diameter of the second hole 121 may be larger than an outer diameter of the tip part of the needle 311 and smaller than an outer diameter of the tapered part 311*a*. For example, when the outer diameter of the tip part of the needle 311 is 2.6 mm, the inner diameter of the first hole 111 may be 2.6 mm, the inner diameter of the second hole 121 may be 3.1 mm, and the outer diameter of the tapered part 311*a* may be 4.6 mm.

The inner diameter of the second hole 121 is sized so as to come into contact with the tip part of the needle 311 when the needle 311 is inserted. Accordingly, by coming into contact with the needle 311 when the needles 311 and 321 to 323 are inserted, the second hole 121 guides the needle 311 to the first hole 111. Further, the play provided at the needle 311 facilitates the guidance.

Further, the inner diameter of the second hole 121 is smaller than the outer diameter of the tapered part 311*a* of the needle 311. Accordingly, with the lid member 301 closed, the tapered part 311*a* presses a peripheral portion of the second hole 121 of the label 120. By this pressing, it is possible to prevent an unnecessary gap from being formed at a portion of the second hole 121 of the ink cartridge 100.

The ink cartridge 100 may also not include the needle receiving member 111*a*, but include the first hole 111 at the upper surface of the main body 101.

Further, each of the first holes 211, 212, and 213 of the ink cartridge 200 for color ink may be provided in a needle receiving member as in FIG. 4.

[1.3 Ink Cartridge for Color Ink and Label]

Next, the ink cartridge 200 will be described in more detail.

Figure 6:
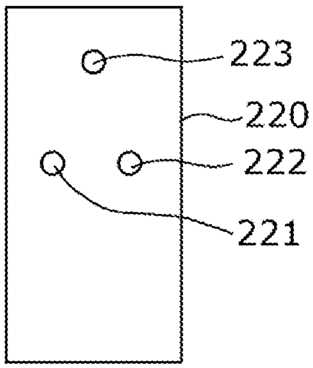
FIG. 6 is a top view of a label for an ink cartridge supporting color ink according to the embodiment.

The ink cartridge 200 includes a label 220 shown in FIG. 6. Although omitted in FIG. 1, the label 220 is attached to the upper surface of the main body 201 by an adhesive or an adhesive tape, and a character string such as a product name, a model number, and a cautionary note of the ink cartridge 200 is printed thereon.

In a plan view of the label 220, the label 220 includes a second hole 221 which overlaps the first hole 211 of the main body 201, a second hole 222 which overlaps the first hole 212, and a second hole 223 which overlaps the first hole 213. The plan view referred to herein is one that views the upper surface of the main body 201 of FIG. 1 and the label 220 from the direction of the lid member 301. A central axis of each second hole may be aligned with a central axis of the corresponding first hole, may be slightly deviated, or may be slightly deviated in a direction away from the hinge 303.

The label 220 is a film containing at least one of polyester, polyethylene, polypropylene, polystyrene, and vinyl chloride. For example, the label 220 is formed of a film obtained by coating 0.025 mm of polyester on 0.066 mm of polypropylene.

The second hole 221 is configured to guide the needle 321 of the lid member 301 to the first hole 211 when the needle 321 is inserted. For example, an inner diameter of the second hole 221 may be smaller than an inner diameter of the first hole 211. The inner diameter of the first hole 211 referred to herein may be a maximum value of the inner diameter when the lateral surface of the first hole 211 has a tapered shape.

Further, the inner diameter of the second hole 221 may be larger than the outer diameter of the tip part of the needle 321. When the outer diameter of the tip part of the needle 321 is 2.6 mm, the inner diameter of the first hole 211 may be 2.6 mm, and the inner diameter of the second hole 221 may be about 3.1 mm.

The inner diameter of the second hole 221 is sized so as to come into contact with the tip part of the needle 321 when the needle 321 is inserted. Accordingly, by coming into contact with the needle 321 when the needle 321 is inserted, the second hole 221 guides the needle 321 to the first hole 211. Further, the play provided at the needle 321 facilitates the guidance.

Further, the inner diameter of the second hole 221 is smaller than the outer diameter of the tapered part 321*a* of the needle 321. Accordingly, with the lid member 301 closed, the tapered part 321*a* presses a peripheral portion of the second hole 221 of the label 220. By this pressing, it is possible to prevent an unnecessary gap from being formed at a portion of the second hole 221 of the ink cartridge 200.

The angle of the tapered part 321*a* of the needle 321 may be an angle capable of pressing, even if only slightly, the second hole 221, and may be, for example, 45 degrees or another angle. Herein, the angle of the tapered part 321*a* is an angle with respect to the longitudinal direction of the needle 321.

The second holes 222 and 223 have the same configuration as the second hole 221.

The ink cartridge 200 may not have three colors. That is, it may have n ink chambers (n is an integer of 2 or more), n first holes, and n second holes. In this case, the lid member 301 may have n needles.

[1.4 Overall Configuration Example of Cartridge Holding Mechanism]

Next, an overall configuration of the cartridge holding mechanism 300 will be described.

Figure 7:
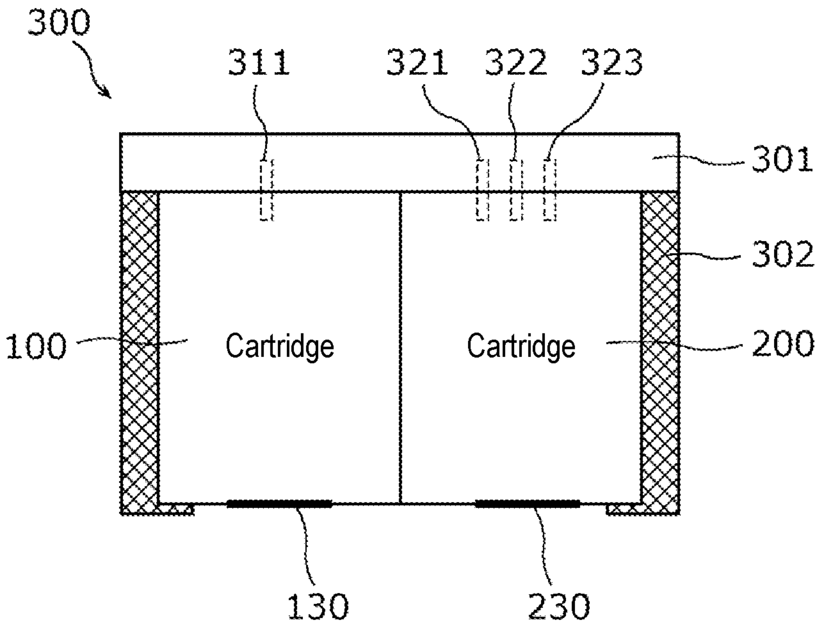
FIG. 7 is a view showing an overall configuration example of the cartridge holding mechanism according to the embodiment.

FIG. 7 is a view schematically showing an overall configuration example of the cartridge holding mechanism 300 according to the embodiment.

As shown in the figure, the cartridge holding mechanism 300 includes a lid member 301, a holding member 302, a hinge, an ink cartridge 100 (also referred to as a cartridge), and an ink cartridge 200 (also referred to as a cartridge). In the figure, only the holding member 302 is shown in a cross section.

The lid member 301 includes needles 311 and 321 to 323, as described with reference to FIG. 1 to FIG. 3.

The holding member 302 holds the ink cartridges 100 and 200 and is connected with the lid member 301 by the hinge. With the lid member 301 opened from the holding member 302, the ink cartridges 100 and 200 may be mounted to the holding member 302. With the lid member 301 closed from the holding member 302, the needle 311 of the lid member 301 is inserted into the ink cartridge 100, and the needles 321 to 323 of the lid member 301 are inserted into the ink cartridge 200.

The hinge 303 connects the lid member 301 and the holding member 302 as shown in FIG. 1.

The ink cartridge 100 includes a head part 130 provided on a lower surface. The head part 130 has a plurality of nozzles ejecting black ink.

The ink cartridge 200 includes a head part 230 provided on a lower surface. The head part 230 has a plurality of nozzles for each color of color ink.

[1.5 Configuration of Printing Apparatus 2]

Next, a configuration example of a printing apparatus 2 including the cartridge holding mechanism 300 will be described.

Figure 8:
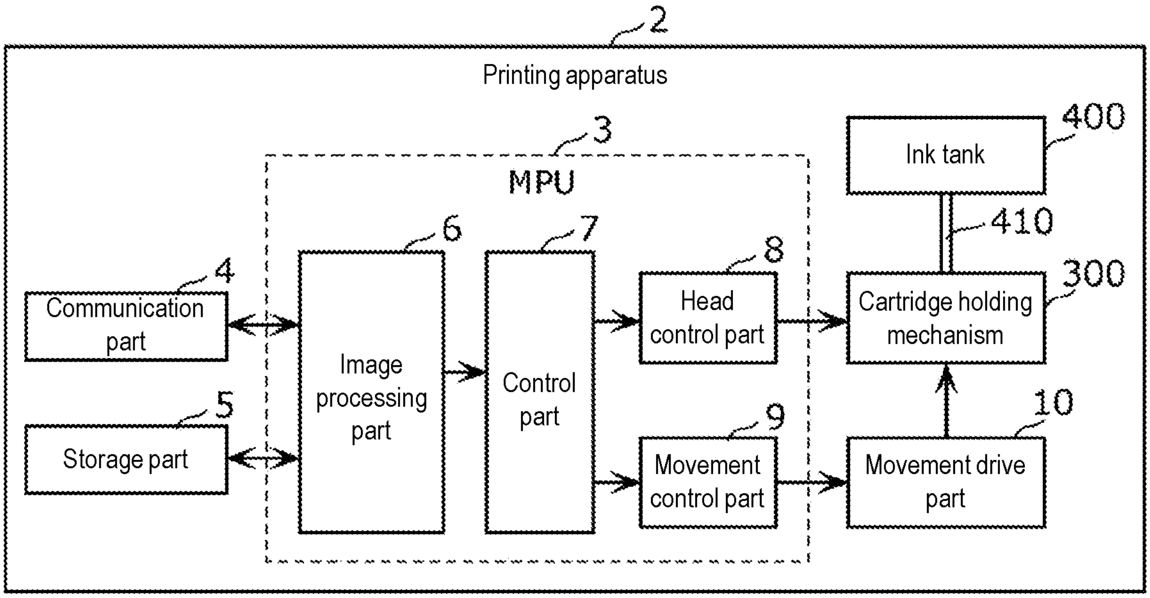
FIG. 8 is a block diagram showing a configuration example of a printing apparatus according to the embodiment.

FIG. 8 is a block diagram showing a configuration example of the printing apparatus 2 according to the embodiment. As shown in the figure, the printing apparatus 2 includes an MPU (micro processing unit) 3, a communication part 4, a storage part 5, a movement drive part 10, a cartridge holding mechanism 300, and an ink tank 400.

The MPU 3 includes an image processing part 6, a control part 7, a head control part 8, and a movement control part 9. The MPU 3 is a microcomputer including a CPU (central processing unit), a memory, an input/output circuit, etc. The CPU realizes the functions of the image processing part 6, the control part 7, the head control part 8, and the movement control part 9 by executing a program in the memory.

The communication part 4 performs wireless communication with an external device such as a smartphone, a tablet terminal, or a PC (personal computer). Specifically, for example, the communication part 4 receives, from the external device, a print instruction signal for instructing the printing apparatus 2 to print. The communication part 4 outputs the received print instruction signal or the like to the image processing part 6.

The storage part 5 is a memory for storing image data to be printed, mode information indicating an operation mode of the printing apparatus 2, and the like. A part of the storage area of the storage part 5 is composed of a non-volatile memory element such as a flash memory.

Based on the print instruction signal from the communication part 4, the image processing part 6 reads out image data stored in the storage part 5 and performs image processing on the read image data. The image processing part 6 outputs the image data that has been subjected to image processing to the control part 7.

The control part 7 controls the head control part 8 and the movement control part 9 to print the image data that has been subjected to image processing by the image processing part 6.

Under the control of the control part 7, the head control part 8 controls ejection of ink by the nozzles of the head part 130 and the head part 230.

Under the control of the control part 7, the movement control part 9 controls movement of the cartridge holding mechanism 300 in directions along a printing surface of a printing target. An X-axis direction and a Y-axis direction which are parallel to the printing surface of the printing target and orthogonal to each other are defined as a main scanning direction and a sub-scanning direction. For example, when the printing target is movable in the sub-scanning direction, the movement control part 9 controls movement of the cartridge holding mechanism 300 in the main scanning direction. Alternatively, when the printing target is not movable, the movement control part 9 controls movement of the cartridge holding mechanism 300 in the main scanning direction and the sub-scanning direction.

The movement drive part 10 has an X-axis motor which moves the cartridge holding mechanism 300 in the main scanning direction, and drives the X-axis motor according to the control of the movement control part 9. The movement drive part 10 has a Y-axis motor which moves the cartridge holding mechanism 300 in the sub-scanning direction, and may drive the Y-axis motor according to the control of the movement control part 9.

The cartridge holding mechanism 300 is as described with reference to FIG. 1 to FIG. 3 and FIG. 7.

The ink tank 400 stores black ink, cyan ink, yellow ink, and magenta ink independently of each other. The ink tank 400 is connected with the cartridge holding mechanism 300 via a tube group 410. The tube group 410 includes the tubes 411 and 421 to 423 shown in FIG. 2. Black ink is supplied from the ink tank 400 to the ink cartridge 100 via the tube 411 and the needle 311. Yellow ink is supplied from the ink tank 400 to the ink cartridge 200 via the tube 421 and the needle 321. Magenta ink is supplied from the ink tank 400 to the ink cartridge 200 via the tube 422 and the needle 322. Cyan ink is supplied from the ink tank 400 to the ink cartridge 200 via the tube 423 and the needle 323. The ink tank 400 may be composed of individual tanks for each color.

[2. Summary]

As described above, an ink cartridge 100 according to an aspect of the disclosure includes a main body 101, a head part 130, a first hole 111, a label 120, and a second hole 121. The main body 101 stores ink. The head part 130 is provided on the main body 101 and has a plurality of nozzles for ejecting ink. A needle 311 for supplying ink to the main body 101 is inserted into the first hole 111, and the first hole 111 has a tapered shape which narrows from an outer side toward an inner side of the main body 101. The label 120 in a film shape is attached to the main body 101. The second hole 121 is provided at the label 120 and overlaps the first hole 111 in a plan view of the label 120. The second hole 121 guides the needle 311 to the first hole 111 when the needle 311 is inserted.

Accordingly, since the second hole of the label guides the needle to the first hole, a component for guidance can be omitted or a groove for guidance can be omitted. As a result, it is possible to reduce the number of components and thus reduce the component cost and the manufacturing cost.

Further, an ink cartridge 200 includes a main body 201, a head part 230, first holes 211 to 213, a label 220, and second holes 221 to 223. The main body 201 stores ink. The head part 230 is provided on the main body 201 and has a plurality of nozzles for ejecting ink. The first holes 211 to 213 have a tapered shape which narrows from an outer side toward an inner side of the main body 201, and needles 321 to 323 for supplying ink to the main body 201 are respectively inserted into the first holes 211 to 213. The label 220 in a film shape is attached to the main body 201. The second holes 221 to 223 are provided at the label 220 and respectively overlap the first holes 211 to 213 in a plan view of the label 220. The second holes 221 to 223 guide the needles 321 to 323 respectively to the first holes 211 to 213 when the needles 321 to 323 are respectively inserted.

Accordingly, since the second hole of the label guides the needle to the first hole, a component for guidance can be omitted or a groove for guidance can be omitted. As a result, it is possible to reduce the number of components and thus reduce the component cost and the manufacturing cost.

Herein, an inner diameter of the second holes 121 and 221 to 223 may be smaller than an inner diameter of the corresponding first holes 111 and 211 to 213.

Accordingly, the performance of the second hole of the label guiding the needle can be better exhibited.

Herein, the main body 101 may include a needle receiving member 111*a* having elasticity, and the first hole 111 may be provided in the needle receiving member 111*a*. Further, the main body 201 may include a plurality of needle receiving members having elasticity, and the first holes 211 to 213 may be provided in the needle receiving members.

Accordingly, with the guidance by the second hole of the label combined with the elasticity of the needle receiving member, it is possible to more reliably and more smoothly guide the needle to the first hole.

Herein, a lateral surface of each of the first holes 111 and 211 to 213 may have a tapered shape, and an inner diameter of the lateral surface of each of the first holes 111 and 211 to 213 may decrease from the outer side toward the inner side of the main body 101 or 201.

Accordingly, it is possible to more reliably and more smoothly guide the needle to the first hole.

Herein, the second holes 121 and 221 to 223 may guide the needles 311 and 321 to 323 to the first holes 111 and 211 to 213 by coming into contact with the needles 311 and 321 to 323 when the needles 311 and 321 to 323 are respectively inserted.

Accordingly, it is possible to ensure the performance of the second hole of the labels 120 and 220 guiding the needle.

Herein, an inner diameter of the second holes 121 and 221 to 223 may be larger than an outer diameter of a tip part of the needles 311 and 321 to 323.

Accordingly, even if the inner diameter of the second hole is larger than the outer diameter of the tip part of the needle, the second hole can guide the needle as long as the second hole and the needle come into contact with each other when the needle is inserted.

Herein, the labels 120 and 220 may include at least one of polyester, polyethylene, polypropylene, polystyrene, and vinyl chloride.

Accordingly, it is possible to use a material which is inexpensive and easy to process in the production of the label.

Herein, the ink cartridge may include n (n being an integer of 2 or more) first holes 211 to 213, and n second holes 221 to 223 corresponding to the n first holes 211 to 213. The main body 201 may have n ink chambers corresponding to n different colors.

Accordingly, it is possible to use a material which is inexpensive and easy to process in the production of the label.

Further, to solve the above problem, a cartridge holding mechanism 300 according to an aspect of the disclosure includes the ink cartridge 100 above, a holding member 302 which holds the ink cartridge 100, a lid member 301 which covers the ink cartridge 100 held by the holding member 302, and a hinge 303 which connects the lid member 301 and the holding member 302. The lid member 301 has the needle 311. Further, a cartridge holding mechanism 300 includes the ink cartridge 200 above, a holding member 302 which holds the ink cartridge 200, a lid member 301 which covers the ink cartridge 200 held by the holding member 302, and a hinge 303 which connects the lid member 301 and the holding member 302. The lid member 301 has the needles 321 to 323.

Accordingly, when the needle which moves with the hinge serving as an axis is inserted into the first hole, the second hole of the label can guide the needle to the first hole. Therefore, a component for guidance can be omitted or a groove for guidance can be omitted. As a result, it is possible to reduce the number of components and thus reduce the component cost and the manufacturing cost.

Herein, an outer diameter of a tip part of the needles 311 and 321 to 323 may be smaller than an inner diameter of the corresponding second holes 121 and 221 to 223.

Accordingly, the performance of the second hole of the label guiding the needle can be better exhibited.

Herein, a portion of the needle 311 in a longitudinal direction may have a tapered part 311*a* of which an outer diameter gradually increases from a tip part of the needle 311 toward the lid member 301. The outer diameter of the tapered part 311*a* may be larger than an inner diameter of the second hole 121. With the lid member 301 closed, the tapered part 311*a* may press a peripheral portion of the second hole 121 of the label 120. Further, a portion of the needles 321 to 323 in a longitudinal direction may have tapered parts 321*a* to 323*a* of which an outer diameter gradually increases from a tip part of the needles 321 to 323 toward the lid member 301. The outer diameter of the tapered parts 321*a* to 323*a* may be larger than an inner diameter of the second holes 221 to 223. With the lid member 301 closed, the tapered parts 321*a* to 323*a* may press a peripheral portion of the second holes 221 to 223 of the label 220.

Accordingly, the sealing property at the first hole of the ink cartridge can be improved.

Herein, the second holes 121 and 221 to 223 may guide the needles 311 and 321 to 323 to the first holes 111 and 211 to 213 by coming into contact with the needles 311 and 321 to 323 when the lid member 301 shifts from an opened state to a closed state.

Accordingly, it is possible to ensure the performance of the second hole of the label guiding the needle.

Further, to solve the above problem, a printing apparatus according to an aspect of the disclosure includes the cartridge holding mechanism 300 above, an ink tank 400, and tubes 411 and 421 to 423 which connect the ink tank 400 and the needles 311 and 321 to 323.

Accordingly, since the second hole of the label guides the needle to the first hole, a component for guidance can be omitted or a groove for guidance can be omitted. As a result, it is possible to reduce the number of components and thus reduce the component cost and the manufacturing cost.

What is claimed is:

1. An ink cartridge comprising:

a main body which stores ink;

a head part which is provided on the main body and has a plurality of nozzles for ejecting ink;

a first hole into which a needle for supplying ink to the main body is inserted, wherein the first hole has a tapered shape which narrows from an outer side toward an inner side of the main body;

a label in a film shape which is attached to an upper surface of the main body; and a second hole which is provided at the label and overlaps the first hole in a plan view of the label, wherein the second hole guides the needle to the first hole when the needle is inserted, wherein the main body comprises a needle receiving member having elasticity and being fitted into a hole at the upper surface of the main body, and the first hole is provided in the needle receiving member.

2. The ink cartridge according to claim 1, wherein an inner diameter of the second hole is smaller than an inner diameter of the first hole.

3. The ink cartridge according to claim 1, wherein a lateral surface of the first hole has a tapered shape, and an inner diameter of the lateral surface of the first hole decreases from the outer side toward the inner side of the main body.

4. The ink cartridge according to claim 1, wherein the second hole guides the needle to the first hole by coming into contact with the needle when the needle is inserted.

5. The ink cartridge according to claim 4, wherein an inner diameter of the second hole is larger than an outer diameter of a tip part of the needle.

6. The ink cartridge according to claim 1, wherein the label comprises at least one of polyester, polyethylene, polypropylene, polystyrene, and vinyl chloride.

7. The ink cartridge according to claim 1, comprising:

n first holes, n being an integer of 2 or more; and n second holes corresponding to the n first holes, wherein the main body has n ink chambers.

8. A cartridge holding mechanism comprising:

an ink cartridge;

a holding member which holds the ink cartridge;

a lid member which covers the ink cartridge held by the holding member; and a hinge which connects the lid member and the holding member, wherein the ink cartridge comprises:

a main body which stores ink;

a head part which is provided on the main body and has a plurality of nozzles for ejecting ink;

a first hole into which a needle for supplying ink to the main body is inserted, wherein the first hole has a tapered shape which narrows from an outer side toward an inner side of the main body;

a label in a film shape which is attached to the main body; and a second hole which is provided at the label and overlaps the first hole in a plan view of the label, wherein the second hole guides the needle to the first hole when the needle is inserted, wherein the lid member has the needle.

9. The cartridge holding mechanism according to claim 8, wherein an outer diameter of a tip part of the needle is smaller than an inner diameter of the second hole.

10. The cartridge holding mechanism according to claim 8, wherein a portion of the needle in a longitudinal direction has a tapered part of which an outer diameter gradually increases from a tip part of the needle toward the lid member, the outer diameter of the tapered part is larger than an inner diameter of the second hole, and with the lid member closed, the tapered part presses a peripheral portion of the second hole of the label.

11. The cartridge holding mechanism according to claim 8, wherein the second hole guides the needle to the first hole by coming into contact with the needle when the lid member shifts from an opened state to a closed state.

12. A printing apparatus comprising:

the cartridge holding mechanism according to claim 8;

an ink tank; and a tube which connects the ink tank and the needle.

* * * * *